US011221908B1

(12) United States Patent
Batta et al.

(10) Patent No.: US 11,221,908 B1
(45) Date of Patent: Jan. 11, 2022

(54) DISCOVERY OF AN INEXPLICIT LINK BETWEEN A CHANGE AND AN INCIDENT IN A COMPUTING ENVIRONMENT

(71) Applicant: International Business Machines Corporation, Armonk, NY (US)

(72) Inventors: Raghav Batta, Ossining, NY (US); George E. Stark, Austin, TX (US); Maja Vukovic, New York, NY (US); Alexandre Francisco Da Silva, Minas Gerais (BR); Jinho Hwang, Ossining, NY (US); Michael Elton Nidd, Zurich (CH); Larisa Shwartz, Greenwich, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/189,974

(22) Filed: Mar. 2, 2021

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0751* (2013.01); *G06F 11/0775* (2013.01); *G06N 20/00* (2019.01)

(58) Field of Classification Search
CPC .............. G06F 11/079; G06F 11/0751; G06F 11/0775; G06N 20/00
USPC ....................................................... 714/1–57
See application file for complete search history.

(56) References Cited

U.S. PATENT DOCUMENTS

| 10,193,741 | B2 | 1/2019 | Zafer et al. | |
| 10,740,692 | B2 | 8/2020 | Mann et al. | |
| 2006/0106847 | A1* | 5/2006 | Eckardt, III | ........ G06F 16/3323 |
| 2008/0270851 | A1* | 10/2008 | Ochi | .................. G06F 11/3466 714/47.2 |
| 2010/0131800 | A1* | 5/2010 | Fujimaki | ................ G06N 7/005 714/37 |
| 2011/0161743 | A1* | 6/2011 | Kato | ................... G06F 11/3409 714/47.2 |

(Continued)

OTHER PUBLICATIONS

"Automated Root Cause Analysis to speed up IT incident resolution," Root Cause Analysis, powered by AIOps, Big Panda, https://www.bigpanda.io/our-product/root-cause-analysis/, 11 pages.

(Continued)

*Primary Examiner* — Sarai E Butler
(74) *Attorney, Agent, or Firm* — Amin, Turocy & Watson, LLP

(57) ABSTRACT

Systems, computer-implemented methods, and computer program products to facilitate discovery of an inexplicit link between a change and an incident in a computing environment are provided. According to an embodiment, a system can comprise a processor that executes computer executable components stored in memory. The computer executable components can comprise an analysis component that determines a defined link strength corresponding to links between change data and incident data in a computing environment. The computer executable components further comprise an extraction component that employs a model to identify an inexplicit link between the change data and the incident data based on the defined link strength.

20 Claims, 10 Drawing Sheets

(56) References Cited

U.S. PATENT DOCUMENTS

| | | | | |
|---|---|---|---|---|
| 2011/0302460 | A1* | 12/2011 | Idgunji | G01R 31/3016 714/55 |
| 2013/0013963 | A1* | 1/2013 | Addison | G06F 11/0754 714/45 |
| 2013/0031423 | A1* | 1/2013 | Barrow | G06F 11/3616 714/47.2 |
| 2014/0122393 | A1* | 5/2014 | Aoki | G06N 20/00 706/12 |
| 2015/0170442 | A1* | 6/2015 | Senalp | G07C 5/0808 701/29.1 |
| 2016/0088521 | A1* | 3/2016 | Ho | H04W 40/22 455/453 |
| 2016/0147901 | A1* | 5/2016 | Adderly | G06F 16/90332 707/726 |
| 2016/0196501 | A1 | 7/2016 | Anand et al. | |
| 2017/0178038 | A1 | 6/2017 | Guven et al. | |
| 2020/0133758 | A1* | 4/2020 | Liu | G06F 11/0727 |
| 2021/0160722 | A1* | 5/2021 | Rengaraju | H04B 17/318 |

OTHER PUBLICATIONS

Sarnovsky et al., "Predictive Models for Support of Incident Management Process in IT Service Management," Acta Electrotechnica et Informatica, vol. 18, No. 1, 2018, 7 pages.
"Introduction to Incident Management," https://www.hci-itil.com/processes/IM.html, last accessed Jan. 28, 2021, 31 pages.
"Automate incident and change management," ServiceNow, https://www.servicenow.com/content/dam/servicenow-assets/public/en-us/doc-type/success/playbook/change-and-incident-management.pdf, 2020, 25 pages.
Mell, Peter, et al. "The NIST Definition of Cloud Computing." National Institute of Standards and Technology. Sep. 2011. 7 pages.
Behr et al., "The Visible Ops Handbook. Implementing itil in 4 practical and auditable steps". http://www.wikisummaries.org/wiki/Visible Ops, 2005, pp. 1-16.
Jason Druebert, "Insight on it service management: Changes, incidents & unintended consequences",https://www.itsmwatch.com/itil/print.php/3866396, 2010, pp. 1-3.
Garter, "The Cost of downtime", https://blogs.gartner.com/andrew-lerner/2014/07/16/the-cost-of-downtime/, 2014, pp. 1-8.
Lou et al., "Software analytics for incident management of online services: An experience report." In 2013 28th IEEE/ACM International Conference on Automated Software Engineering (ASE), 2013, pp. 475-485.
Junjie Chen, Xiaoting He, Qingwei Lin, Yong Xu, Hongyu Zhang, Dan Hao, Feng Gao, Zhangwei Xu, Yingnong Dang, and Dongmei Zhang. How to mitigate the incident? an effective troubleshooting guide recommendation technique for online service systems. In ESEC/FSE 2020 Industry, Oct. 2020.
Change risk assessment: Understanding risks involved in changing software requirements. In Software Engineering Research and Practice 01 2006, pp. 1-7.
Rahman et al,."A risk model of requirements change impact analysis". JSW, 9(1), 2014, pp. 76-81.
Jayatilleke et al., "A systematic review of requirements change management. Information and Software Technology", 2018 pp. 1-23.
Guven et al., "Coach: Cognitive analytics for change", In 2017 IFIP/IEEE Symposium on Integrated Network and Service Management (IM), 2017, pp. 720-725.IEEE, 2017.
Shalinka Jayatilleke and Richard Lai. A method of specifying and classifying requirements change. In Proceedings of the 2013 22nd Australian Conference on Software Engineering, pp. 175-180, 2013.
Guven et al., "Change risk expert: Leveraging advanced classification and risk management techniques for systematic change failure reduction", In 2012 IEEE Network Operations and Management Symposium, IEEE 2012, pp. 1-16.
Lecun et al.,"Deep learning". nature, 2015, pp. 436-444.
Mikolov et al., "Extensions of recurrent neural network language model", In 2011 IEEE international conference on acoustics, speech and signal processing (ICASSP),IEEE, 2011, pp. 5528-5531.
Hochreiter et al., "Long short-term memory. Neural computation", 1997, pp. 1735-1780.
G¯uven et al., Understanding the role of change in incident prevention. In 2016 12th International Conference on Network and Service Management (CNSM), pp. 268-271. IEEE, 2016.
Guven et al., "Towards establishing causality between change and incident", In NOMS 2016—2016 IEEE/IFIP Network Operations and Management Symposium,2016, pp. 937-942.
McGee et al.,"A software requirements change source taxonomy", In 2009 Fourth International Conference on Software Engineering Advances, IEEE, 2009, pp. 51-58.
Elvira Maria Arvanitou. Proposing and empirically validating change impact analysis metrics. PhD thesis, University of Groningen, Jul. 2018.
Shwartz et al., "Quality of it service delivery—analysis and framework for human error prevention", In 2010 IEEE International Conference on Service-Oriented Computing and Applications (SOCA), 2010, pp. 1-8.
Johnson et al., "Survey on deep learning with class imbalance", Journal of Big Data, 6(1):27, 2019, pp. 1-54.
Chawla et al.,"Special issue on learning from imbalanced data sets". ACM SIGKDD explorations newsletter, 2004, pp.1-6.
Chawla et al., Smote: synthetic minority over-sampling technique. Journal of artificial intelligence research, 2002, pp. 321-357.
Mani et al., "knn approach to unbalanced data distributions: a case study involving information extraction", In Proceedings of workshop on learning from imbalanced datasets, vol. 126, 2003, pp. 1-7.
Bartosz Krawczyk., "Learning from imbalanced data: open challenges and future directions", Progress in Artificial Intelligence, 2016, pp. 221-232.
Mikolov et al., "Advances in pretraining distributed word representations", In Proceedings of the International Conference on Language Resources and Evaluation (LREC 2018), 2018, pp. 1-4.
Samanta et al., "Carbon to diamond: An incident remediation assistant system from site reliability engineers conversations in hybrid cloud operations", 2020, pp. 1-7.
Ribeiro et al., "Why should i trust you?: Explaining the predictions of any classifier", In Proceedings of the 22nd ACM SIGKDD international conference on knowledge discovery and data mining, 2016, pp. 1135-1144.

* cited by examiner

Algorithm 500 Determine Defined Link Strength

Input: Explicit linkages $E[e_1, e_m]$ with linkage strengths $\Theta_E$, Candidate linkages $C[c_1, c_p]$ with linkage strengths $\Theta_C$ $\Gamma_{min} \rightarrow \infty$ $\eta = \begin{cases} \frac{|C|}{|E|}, & \text{if } |C| > |E| \\ 1, & \text{otherwise} \end{cases}$ $\theta_{optimal} = 0$ for $\theta_{current} \in [\Theta_E \cup \Theta_C]$ do
   $v_e = \{e \mid (e \in E) \wedge (\theta_e < \theta_{current})\}$
   $v_c = \{c \mid (c \in C) \wedge (\theta_c < \theta_{current})\}$
   $\Gamma_e = (|v_e| - |v_e'|) * \eta$
   $\Gamma_c = (|v_c'| - |v_c|)$
   $\Gamma_{total} = \Gamma_e + \Gamma_c$
   if $\Gamma_{total} < \Gamma_{min}$ then
     $\Gamma_{min} = \Gamma_{total}$
     $\theta_{optimal} = \theta_{current}$
   end if
end for

FIG. 5

DISCOVERY OF AN INEXPLICIT LINK BETWEEN A CHANGE AND AN INCIDENT IN A COMPUTING ENVIRONMENT

BACKGROUND

The subject disclosure relates to a link between a change and an incident in a computing environment, and more specifically, to discovery of an inexplicit link between a change and an incident in a computing environment.

Changes implemented in a computing environment can cause incidents that result in outages of one or more computing resources. Even changes that are closed as successful can lead to incidents, and when they do, it can be a big problem. In addition, changes that cause one incident can subsequently cause other incidents. What's more, many major incidents can be directly linked to a recent change.

Due to the huge volume of incident tickets generated by automatic monitoring systems, conducting a detailed root cause analysis (RCA) for every incident to identify its cause is often impossible for a site reliability engineer (SRE). RCAs are typically conducted for major incidents only, giving an incomplete representation of change-induced incidents, and potentially leading to repetitive systemic issues.

A problem with existing change risk assessment technologies is that they lack clear ground truth data of all the incidents induced by change tickets, and thus, are ineffective. That is, a problem with such existing change risk assessment technologies is that they do not discover inexplicit change-incident links in a computing environment, and therefore, they lack clear ground truth data of all the incidents induced by change tickets implemented in the computing environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate discovery of an inexplicit link between a change and an incident in a computing environment are described.

According to an embodiment, a system can comprise a processor that executes computer executable components stored in memory. The computer executable components can comprise an analysis component that determines a defined link strength corresponding to links between change data and incident data in a computing environment. The computer executable components further comprise an extraction component that employs a model to identify an inexplicit link between the change data and the incident data based on the defined link strength. An advantage of such a system is that it can discover a link between a change and an incident in a computing environment, where such discovery can enable an entity to reduce operational risk of one or more computing resources in the computing environment.

In some embodiments, the computer executable components can further comprise a filter component that employs an active learning process to filter at least one false inexplicit link from one or more inexplicit links identified by the model. The active learning process is based on expert entity feedback corresponding to at least one of the defined link strength or the inexplicit link. An advantage of such a system is that it can discover a link between a change and an incident in a computing environment, where such discovery can enable an entity to reduce operational risk of one or more computing resources in the computing environment.

According to another embodiment, a computer-implemented method can comprise determining, by a system operatively coupled to a processor, a defined link strength corresponding to links between change data and incident data in a computing environment. The computer-implemented method can further comprise employing, by the system, a model to identify an inexplicit link between the change data and the incident data based on the defined link strength. An advantage of such a computer-implemented method is that it can be implemented to discover a link between a change and an incident in a computing environment, where such discovery can enable an entity to reduce operational risk of one or more computing resources in the computing environment.

In some embodiments, the computer-implemented method can further comprise employing, by the system, an active learning process to filter at least one false inexplicit link from one or more inexplicit links identified by the model. The active learning process is based on expert entity feedback corresponding to at least one of the defined link strength or the inexplicit link. An advantage of such a computer-implemented method is that it can be implemented to discover a link between a change and an incident in a computing environment, where such discovery can enable an entity to reduce operational risk of one or more computing resources in the computing environment.

According to another embodiment, a computer program product comprising a computer readable storage medium having program instructions embodied therewith, the program instructions executable by a processor to cause the processor to determine a defined link strength corresponding to links between change data and incident data in a computing environment. The program instructions are further executable by the processor to cause the processor to employ a model to identify an inexplicit link between the change data and the incident data based on the defined link strength. An advantage of such a computer program product is that it can be implemented to discover a link between a change and an incident in a computing environment, where such discovery can enable an entity to reduce operational risk of one or more computing resources in the computing environment.

In some embodiments, the program instructions are further executable by the processor to cause the processor to employ an active learning process to filter at least one false inexplicit link from one or more inexplicit links identified by the model. The active learning process is based on expert entity feedback corresponding to at least one of the defined link strength or the inexplicit link. An advantage of such a computer program product is that it can be implemented to discover a link between a change and an incident in a computing environment, where such discovery can enable an entity to reduce operational risk of one or more computing resources in the computing environment.

DESCRIPTION OF THE DRAWINGS

FIG. 5 illustrates an example, non-limiting algorithm that can facilitate discovery of an inexplicit link between a change and an incident in a computing environment in accordance with one or more embodiments described herein.

DETAILED DESCRIPTION

Figure 1:
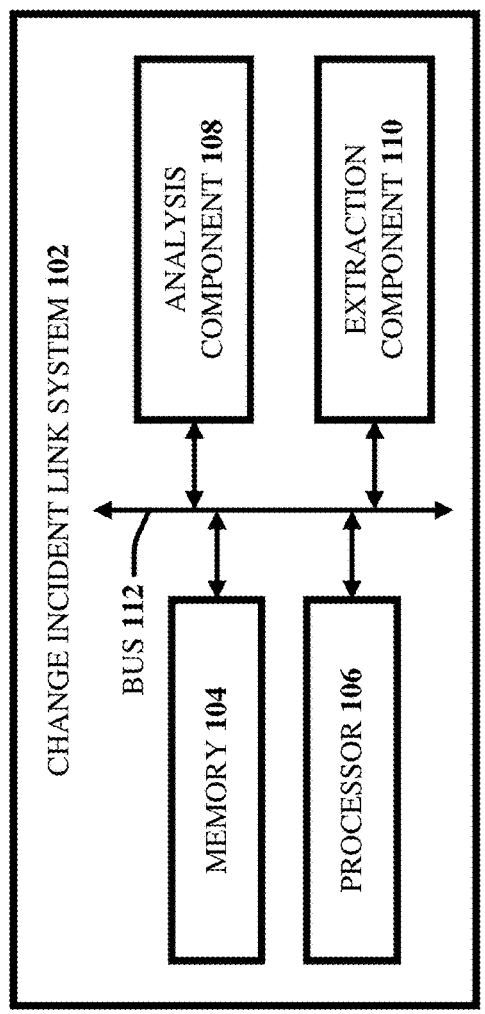
FIGS. 1, 2, 3, and 4 illustrate block diagrams of example, non-limiting systems that can facilitate discovery of an inexplicit link between a change and an incident in a computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing change risk assessment technologies, the present disclosure can be implemented to produce a solution to these problems in the form of systems, computer-implemented methods, and/or computer program products that can facilitate discovery of an inexplicit link between a change and an incident in a computing environment by: determining a defined link strength corresponding to links between change data and incident data in a computing environment; and/or employing a model to identify an inexplicit link between the change data and the incident data based on the defined link strength. An advantage of such systems, computer-implemented methods, and/or computer program products is that they can be implemented to discover a link between a change and an incident in a computing environment, where such discovery can enable an entity to reduce operational risk of one or more computing resources in the computing environment.

In some embodiments, the present disclosure can be implemented to produce a solution to the problems described above in the form of systems, computer-implemented methods, and/or computer program products that can further facilitate discovery of an inexplicit link between a change and an incident in a computing environment by: employing an active learning process to filter at least one false inexplicit link from one or more inexplicit links identified by the model, where the active learning process is based on expert entity feedback corresponding to at least one of the defined link strength or the inexplicit link. An advantage of such systems, computer-implemented methods, and/or computer program products is that they can be implemented to discover a link between a change and an incident in a computing environment, where such discovery can enable an entity to reduce operational risk of one or more computing resources in the computing environment.

It should be appreciated from the description below that the various embodiments of the subject disclosure can enable discovery of one or more links between changes performed and incidents occurring in a legacy computing environment and/or a cloud computing environment. It should also be appreciated from the description below that the various embodiments of the subject disclosure can further enable a site reliability engineer (SRE) to prevent potential incidents and/or failures that can be caused by a proposed change, thus minimizing the overall operational risk of the computing environment. For example, it should be appreciated from the description below that the various embodiments of the subject disclosure can enable: collection of historic operational data for change tickets, incident tickets, and/or root cause analysis (RCA) to discover links between changes and incidents to identify change-induced incidents; extraction of specific characteristics from the change and incident tickets and determination of their weights and hence their significance in determining the probabilistic relationships between changes and incidents; determination of the linkage strength for each candidate change-incident pair generated from change and incident tickets occurring within a fixed time window; leveraging of the information from explicit linkages determined by an SRE while conducting RCAs for major incidents to determine the cutoff value for linkage strength (referred to herein as the "defined link strength") for candidate pairs where an RCA was not conducted; and/or implementation of a supervised learning system (e.g., an active learning system) to filter out false alerts from the final set of change-incident linkages determined by using the above referenced linkage strength cutoff, where such false alerts can be caused by, for instance, monitoring issues, incidents generated during an approved change window, and/or another cause. In an embodiment, such a supervised learning system (e.g., an active learning system) can gather entity feedback (e.g., expert entity feedback) and/or adjust the learning model with that feedback to increase the accuracy of the system as it is rolled out more broadly.

As referenced herein, an "entity" can comprise a human, a client, a user, a computing device, a software application, an agent, a machine learning (ML) model, an artificial intelligence (AI) model, and/or another entity. As referenced herein, an "expert entity" can comprise a human, a computing device, a software application, an expert agent, an AI model, an ML model, and/or another entity that can assess and/or verify the accuracy of the change risk assessment score referenced above. As referenced herein, "change data" can comprise data (e.g., text, tokens, features, charts, and/or other data) in a change ticket associated with a computing environment. As referenced herein, "incident data" can comprise data (e.g., text, tokens, features, charts, and/or other data) in an incident ticket associated with a computing environment. As referenced herein, an "inexplicit link" between change data and incident data can comprise a probabilistic link between change data in change tickets and incident data in incident tickets associated with a computing environment.

Figure 2:
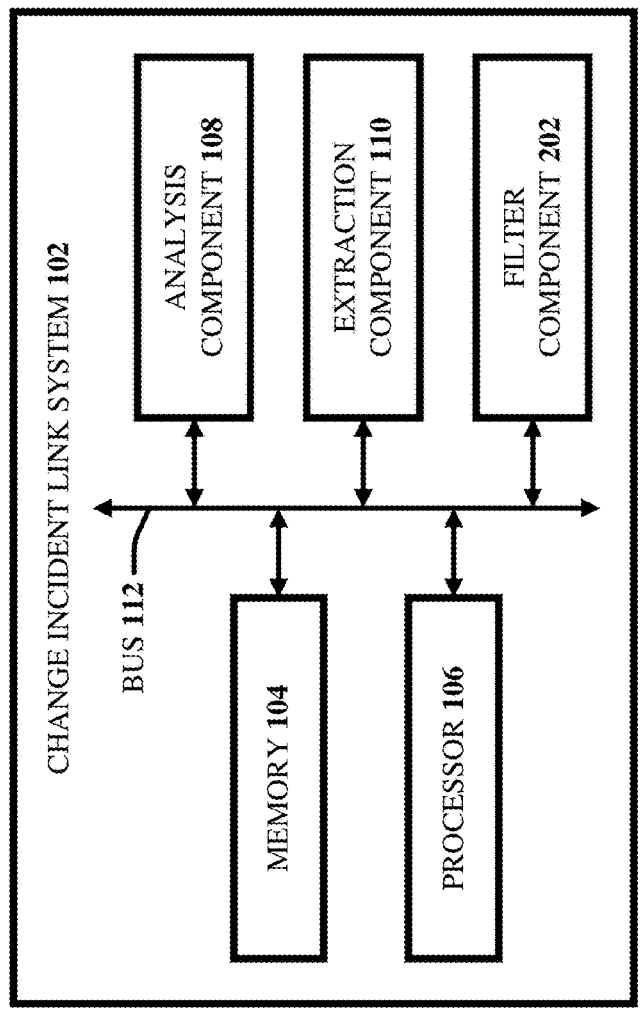

FIGS. 1 and 2 illustrate block diagrams of example, non-limiting systems 100 and 200, respectively, that can each facilitate discovery of an inexplicit link between a change and an incident in a computing environment in accordance with one or more embodiments described herein. System 100 and/or 200 can each comprise a change incident link system 102. Change incident link system 102 of system 100 depicted in FIG. 1 can comprise a memory 104, a processor 106, an analysis component 108, an extraction component 110, and/or a bus 112. Change incident link system 102 of system 200 depicted in FIG. 2 can further comprise a filter component 202.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or change incident link system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to change incident link system 102, analysis component 108, extraction component 110, filter component 202, and/or another component associated with change incident link system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Change incident link system 102, memory 104, processor 106, analysis component 108, extraction component 110, filter component 202, and/or another component of change incident link system 102 as described herein can be communicatively, electrically, operatively, and/or optically coupled to one another via bus 112 to perform functions of system 100, system 200, change incident link system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Change incident link system 102 can comprise any type of component, machine, device, facility, apparatus, and/or instrument that comprises a processor and/or can be capable of effective and/or operative communication with a wired and/or wireless network. All such embodiments are envisioned. For example, change incident link system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Change incident link system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, change incident link system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, change incident link system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Change incident link system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, change incident link system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between change incident link system 102 and external systems, sources, and/or devices (e.g., computing devices, communication devices, and/or another type of external system, source, and/or device).

Change incident link system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with change incident link system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, analysis component 108, extraction component 110, filter component 202, and/or any other components associated with change incident link system 102 as disclosed herein (e.g., communicatively, electronically, operatively, and/or optically coupled with and/or employed by change incident link system 102), can comprise such computer and/or machine readable, writable, and/or executable component(s) and/or instruction(s). Consequently, according to numerous embodiments, change incident link system 102 and/or any components associated therewith as disclosed herein, can employ processor 106 to execute such computer and/or machine readable, writable, and/or executable component(s) and/or instruction(s) to facilitate performance of one or more operations described herein with reference to change incident link system 102 and/or any such components associated therewith.

Change incident link system 102 can facilitate (e.g., via processor 106) performance of operations executed by and/or associated with analysis component 108, extraction component 110, filter component 202, and/or another component associated with change incident link system 102 as disclosed herein. For example, as described in detail below, change incident link system 102 can facilitate (e.g., via processor 106): determining a defined link strength corresponding to links between change data and incident data in a computing environment; and/or employing a model to identify an inexplicit link between the change data and the incident data based on the defined link strength.

In the above example, as described in detail below, change incident link system 102 can further facilitate (e.g., via processor 106): generating one or more candidate links between the change data and the incident data and determining link strengths of the one or more candidate links, where an incident described in the incident data occurred within a defined amount of time after a change described in the change data occurred; determining the defined link strength based on at least one of explicit links between the change data and the incident data or candidate links between the change data and the incident data and that have common features; employing an active learning process to determine or modify the defined link strength based on expert entity feedback corresponding to at least one of the defined link strength or the inexplicit link; employing the active learning process to reduce identification of false inexplicit links, improving accuracy or performance of the model in identifying the inexplicit link, or reducing operational risk associated with one or more computing resources of the computing environment; filtering at least one false inexplicit link from one or more inexplicit links identified by the model; and/or employing an active learning process to filter at least one false inexplicit link from one or more inexplicit links identified by the model, where the active learning process is based on expert entity feedback corresponding to at least one of the defined link strength or the inexplicit link.

Analysis component 108 can determine a defined link strength (e.g., a minimum link strength) corresponding to links between change data and incident data in a computing environment. For example, analysis component 108 can determine a defined link strength that can be indicative of a defined link strength threshold (e.g., a minimum link strength) corresponding to links between change data in a change ticket and incident data in an incident ticket of a computing environment (e.g., a legacy computing environment, a cloud computing environment, a quantum computing environment, and/or another computing environment). As an example, to determine such a defined link strength, analysis component 108 can implement (e.g., execute, run) algorithm 500 described below and illustrated in FIG. 5.

In some embodiments, analysis component 108 can determine the above referenced defined link strength based on one or more explicit links between the change data and the incident data and/or based on one or more candidate links between the change data and the incident data, where such one or more candidate links have at least one common feature. In these embodiments, analysis component 108 can generate one or more of such candidate links by identifying an incident described in incident data that occurred within a defined amount of time after a change described in change data occurred. In these embodiments, analysis component 108 can generate such one or more candidate links between the change data and the incident data and can further determine link strengths of the one or more candidate links.

Identify Explicit Links

To identify explicit links between change data and incident data, analysis component 108 can scan text fields of historical incident tickets and extract explicit mentions of change ticket numbers, which constitute explicit links between change data and incident data. To scan such text fields and/or extract such explicit links between change data (e.g., change ticket numbers) and incident data (e.g., historical incident tickets), analysis component 108 can employ one or more models (e.g., an ML and/or AI model) and/or techniques including, but not limited to: natural language processing (NLP), deep NLP parsing (e.g., using one or more neural networks), portable document format (PDF) parsing, text passage classifiers, entity extraction, supervised frequent pattern learning, unsupervised frequent pattern learning, semantic filtering, and/or another model and/or technique. In some embodiments, analysis component 108 can obtain and/or use explicit links between change data and incident data that have been identified by an expert entity such as, for instance, an SRE in conducting an RCA.

Based on identifying and/or obtaining such explicit links described above, analysis component 108 can further determine (e.g., via an NLP model) a minimum and/or a maximum time difference (e.g., in days) between the change implementation and incidents induced by these changes. Analysis component 108 can further determine a defined time difference (e.g., 5 days, 15 days, 25 days, and/or another time difference) having the highest percentage of explicit links between the change implementation and incidents induced by the changes. As described below, analysis component 108 and/or extraction component 110 can use such a defined time difference to enable discovery of one or more inexplicit links between change data and incident data.

Generate Change-Incident Candidate Links

Analysis component 108 can generate one or more candidate links that have potential of being an inexplicit link between change data and incident data. To generate such one or more candidate links, analysis component 108 can perform a cartesian product of each change ticket to the incident tickets that occurs within the above referenced defined time difference (e.g., 15 days) of the change implementation in the same computing environment for which the change was implemented. For each candidate linkage, analysis component 108 can employ, for instance, an ML and/or AI model (e.g., an NLP model) to determine whether there exists one or more common tokens (e.g., features) between the change data (e.g., change text in a change ticket) and the incident data (e.g., incident text in an incident ticket) of the candidate link. Based on identifying one or more common tokens between the change data and the incident data of one or more candidate links, analysis component 108 can thereby identify one or more candidate links that could potentially comprise one or more real change-incident links (e.g., inexplicit links) that were not explicitly identified by analysis component 108 and/or a SRE (e.g., when conducting an RCA).

Compute Link Strength of Candidate Links

For a certain candidate link (e.g., a certain candidate change-incident link), analysis component 108 can designate a relatively higher or lower weight to respective common tokens in determining the linkage between the change data and incident data as compared to other candidate links. For example, having 5 common tokens which are words from everyday language usage such as, for instance, "which," "this," "do," "can," "work," and/or another common word will not be as useful in determining the link between change data and incident data as having, for instance, a single common token which is an alphanumeric image name or a uniform resource locator (URL) that occurs very rarely in both the change data and incident data but still occurs as a common word for a given candidate pair. That is, for example, certain terms have much higher discriminating power in determining context of change data and/or incident data.

To assign a weight to each token in the change data and incident data separately, analysis component 108 can use inverse document frequency (IDF). For a given token t, its IDF in change data and incident data is denoted by $C_t$ and $I_t$ respectively. For a candidate link with one or more common tokens between change data and incident data represented by T, analysis component 108 can compute the link strength S of such a candidate link, using Equation (1) defined below as:

$$S = \Sum_{t=1}^{T} C_t^w * I_t^w, t \in T \quad (1)$$

where, change token weight: $C^w$=IDF of token in change data (e.g., change tickets) and incident token weight: $I^w$=IDF of token in incident data (e.g., incident tickets). Using this approach, analysis component 108 can compute link strength for each candidate link. Analysis component 108 can further use the above approach to compute the link strength of each explicit link that can be identified by analysis component 108 and/or an SRE as described above.

Compute Defined Link Strength (e.g., Defined Link Strength Threshold)

Based on determining the link strength of each eplicit link and/or each candidate link as described above, analysis component 108 can further compare the link strength of one or more explicit links to that of one or more candidate links by performing an independent sample t-test which tests the null hypothesis that the mean value of link strength is the same for both explicit and candidate links versus the alternate hypothesis that the mean of link strength is significantly different for the two groups. In one embodiment, the test can return, for instance, a p–value<0.001, with mean values of the explicit links being relatively higher that that of the candidate links, allowing analysis component 108 to reject the null hypothesis at a significance level of, for example, α=0.05 and accept the alternate hypothesis.

As indicated above, analysis component 108 can implement (e.g., execute, run) algorithm 500 to determine a defined link strength (e.g., a defined link strength threshold indicative of a minimum link strength). As described below, extraction component 110 and/or filter component 202 can use such a defined link strength to perform their respective operations as described herein in accordance with one or more embodiments of the subject disclosure.

With reference to algorithm 500 illustrated in FIG. 5, analysis component 108 can define $\Theta_E$ and $\Theta_C$ as the set of link strengths for all explicit links E and candidate linkages C, respectively. Analysis component 108 can iterate over all possible values of link strength to compute the total cost $\Gamma_{total}$ at each value of $\theta \in [\Theta_E \cup \Theta_C]$ and choose the link strength with the minimum cost $\Gamma_{min}$ as the optimal cutoff $\theta_{optimal}$. To maximize the number of explicit links to be above the optimal cutoff $\theta_{optimal}$, analysis component 108 can impose a cost for $\theta_{current}$ based on the number of explicit links from E which have a link strength $\theta_e$ below $\theta_{current}$ as compared to its compliment set. Similarly, analysis component 108 can impose a cost for $\theta_{current}$ based on the number of candidate links from C which have a link strength $\theta_c$ above $\theta_{current}$ as compared to its compliment set. Analysis component 108 can impose a higher cost for explicit links by a factor of which is chosen as the ratio number of number of candidate links to explicit links.

Extraction component 110 can employ a model to identify an inexplicit link between change data and incident data based on the defined link strength that can be determined by analysis component 108 as described above. For example, extraction component 110 can employ an ML and/or AI model such as, for instance, a classification model, an outliers model, a time series model, a clustering model, and/or another model to identify an inexplicit link between change data and incident data using the defined link strength that can be determined by analysis component 108 as described above. For instance, if such a model identifies that a certain candidate link has a link strength that is greater than the defined link strength, then such a model can determine (e.g., classify) the candidate link as an inexplicit link.

Filter component 202 can filter at least one false inexplicit link from one or more inexplicit links that can be identified by extraction component 110 and/or the model that can be employed by extraction component 110 to perform such identification. For example, filter component 202 can employ an ML and/or AI model and/or technique (e.g., a supervised learning technique) to filter out one or more false alerts from one or more change-incident links that can be determined by extraction component 110 using the defined link strength that can be computed by analysis component 108 as described above. These false alerts can be caused by, for instance, monitoring issues, incidents generated during an approved change window, and/or another cause.

To filter one or more false inexplicit links, filter component 202 can employ an ML and/or AI model and/or technique such as, for instance, a predictive model to predict the probability of an incident to be a false alert. For example, filter component 202 can employ a predictive model that can include, but is not limited to, a forecast model, a classification model, an outliers model, a time series model, a clustering model, and/or another model. Based on filtering one or more of such false inexplicit links, change incident link system 102 and/or filter component 202 can display results of one or more extracted inexplicit links with corresponding linkage confidence (e.g., in terms of a probability that an incident is a false alert) and further collect feedback from, for instance, an expert entity (e.g., an SRE). To displays such results (e.g., on a computer monitor), change incident link system 102 and/or filter component 202 can utilize an interface component (not illustrated in the figures) of change incident link system 102 (e.g., an application programming interface (API), a representational state transfer API, a graphical user interface (GUI), and/or another interface component).

In some embodiments, filter component 202 can employ an active learning process to filter at least one false inexplicit link from one or more inexplicit links that can be identified by extraction component 110 and/or the model that can be employed by extraction component 110 to perform such identification. In these embodiments, the active learning process can be based on expert entity feedback corresponding to the above referenced defined link strength that can be determined by analysis component 108 and/or the inexplicit link that can be identified by extraction component 110. In these embodiments, filter component 202 can use such an active learning process to tune the above described predictive model it can employ to filter false alerts and/or to enable analysis component 108 to update the defined link strength value by incorporating the expert entity feedback.

In some embodiments, analysis component 108 can employ the active learning process described above to determine and/or modify the defined link strength based on expert entity feedback corresponding to the defined link strength and/or the inexplicit link that can be identified by extraction component 110. In these embodiments, analysis component 108 can employ the active learning process to: reduce identification of false inexplicit links; improve accuracy and/or performance of the model in identifying the inexplicit link; and/or reduce operational risk associated with one or more computing resources of a computing environment.

Figure 3:
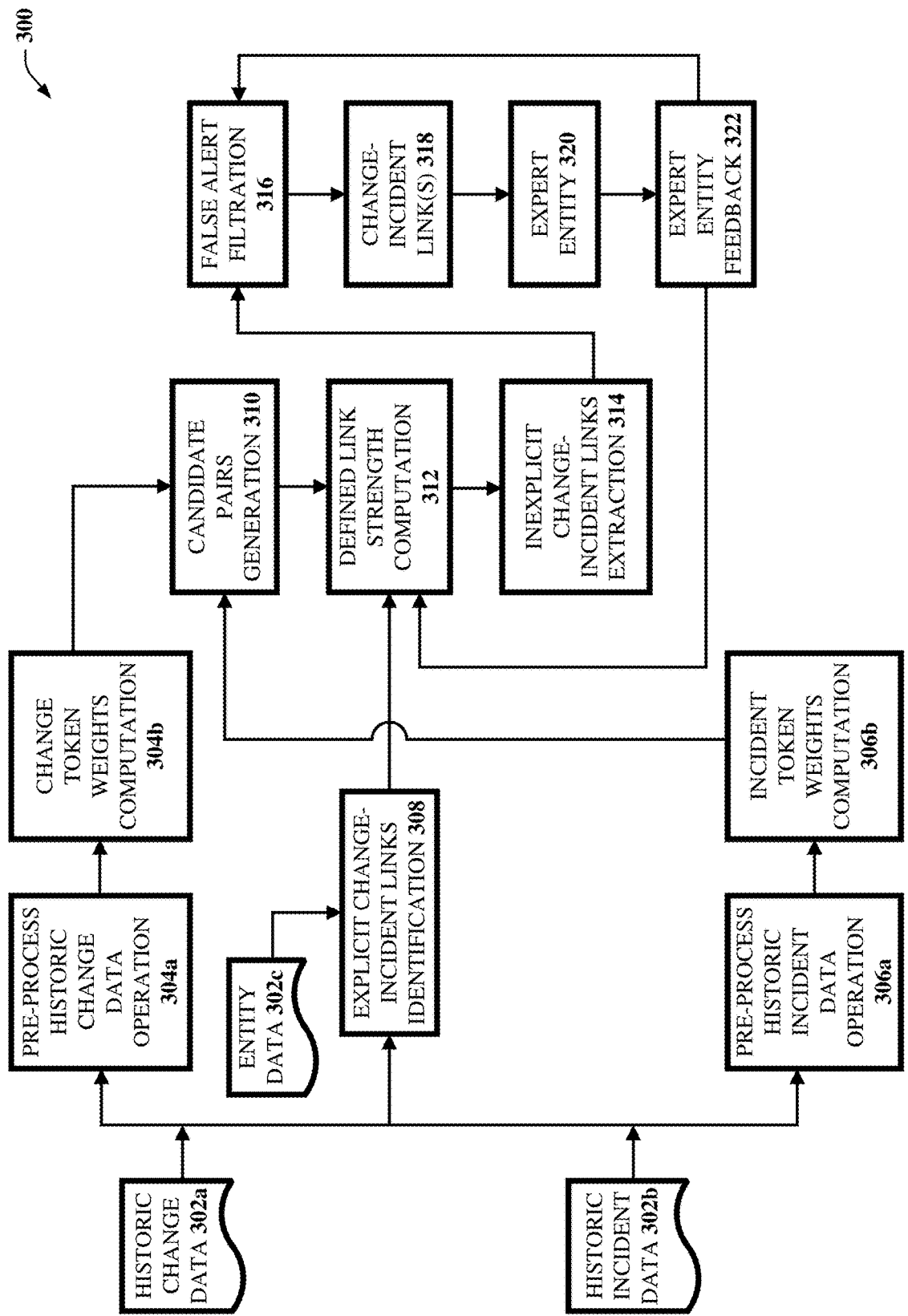

FIG. 3 illustrates a block diagram of an example, non-limiting system 300 that can facilitate discovery of an inexplicit link between a change and an incident in a computing environment in accordance with one or more embodiments described herein. Repetitive description of like elements and/or processes employed in respective embodiments is omitted for sake of brevity.

As illustrated in the example embodiment depicted in FIG. 3, based on obtaining historic change data 302a (e.g., change tickets, SRE dialogue data, logs, and/or other data) and/or historic incident data 302b (e.g., RCA reports, incident tickets, resolution data, SRE dialogue data, logs, and/or other data) as described above with reference to FIGS. 1 and 2, change incident link system 102 and/or analysis component 108 can perform pre-process historic change data operation 304a and/or pre-process historic incident data operation 306a to obtain change text and incident text, respectively. For example, to perform such pre-processing operations, change incident link system 102 and/or analysis component 108 can: remove special characters from historic change data 302a and/or historic incident data 302b; remove date and time values, as well as time zones mentioned in historic change data 302a and/or historic incident data 302b; convert all text to lower case in historic change data 302a and/or historic incident data 302b; remove stopwords (e.g., only for English language) from historic change data 302a and/or historic incident data 302b; and apply lemmatization. The change ticket fields that change incident link system 102 and/or analysis component 108 can apply these pre-processing operations to can include, but are not limited to: change title, incident title, change description, incident description, change purpose, impacted configuration item(s), backout plan, resolution description, and/or caused by change. Change incident link system 102 and/or analysis component 108 can further concatenate the pre-processed text from these fields to create change text (referred to herein as "change data") and/or incident text (referred to herein as "incident data").

As illustrated in the example embodiment depicted in FIG. 3, based on performing the pre-processing operations described above, analysis component 108 can perform change token weights computation 304b and/or incident token weights computation 306b to assign a weight to each token in historic change data 302a and/or historic incident data 302b, respectively. For example, to perform such token weights computations, analysis component 108 can use inverse document frequency (IDF) and/or Equation (1) as described above with reference to FIGS. 1 and 2. Using the IDF approach and/or Equation (1), analysis component 108 can compute link strength for each candidate link that can be generated by analysis component 108 as described below. Analysis component 108 can further use the IDF approach and/or Equation (1) to compute the link strength of each explicit link that can be identified by analysis component 108 and/or, for example, an SRE as described below.

As illustrated in the example embodiment depicted in FIG. 3, based on performing the pre-processing operations and/or token weights computations described above, analysis component 108 can use the change text, incident text, and/or token weights to perform candidate pairs generation 310. For example, to perform candidate pairs generation 310, analysis component 108 can generate the one or more candidate links between the change text and incident text as described above with reference to FIGS. 1 and 2.

As illustrated in the example embodiment depicted in FIG. 3, analysis component 108 can perform explicit change-incident links identification 308. In the example embodiment depicted in FIG. 3, analysis component 108 can perform explicit change-incident links identification 308 based on obtaining entity data 302a, which can comprise SRE identification of explicit links between the change data and incident data. In some embodiments, analysis component 108 can perform explicit change-incident links identification 308 by employing an ML and/or AI model and/or technique (e.g., an NLP model) to extract such explicit links from change data and incident data as described above with reference to FIGS. 1 and 2.

As illustrated in the example embodiment depicted in FIG. 3, based on performing explicit change-incident links identification 308 and candidate pairs generation 310, analysis component 108 can further perform defined link strength computation 312 to determine the defined link strength (e.g., minimum link strength) as described above with reference to FIGS. 1 and 2 (e.g., by executing algorithm 500). In the example embodiment depicted in FIG. 3, based on analysis component 108 performing defined link strength computation 312, extraction component 110 can perform inexplicit change-incident links extraction 314 to discover one or more inexplicit links between change data and incident data.

As illustrated in the example embodiment depicted in FIG. 3, based on extraction component 110 performing inexplicit change-incident links extraction 314, filter component 202 can perform false alert filtration 316 to filter out one or more false inexplicit links from those extracted by extraction component 110 to yield change incident link(s) 318. In the example embodiment depicted in FIG. 3, change incident link system 102 and/or filter component 202 can provide (e.g., via a GUI of change incident link system 102) change-incident link(s) 318 to an expert entity 320 (e.g., an SRE) that can assess and/or verify accuracy of change-incident link(s) 318. In this example embodiment, based on expert entity 320 assessing and/or verifying accuracy of change-incident link(s) 318, expert entity 320 can further provide expert entity feedback 322 to analysis component 108 and/or filter component 202 to respectively update the defined link strength and/or fine tune the above described predictive model that can be used by filter component 202 based on expert entity feedback 322.

Figure 4:
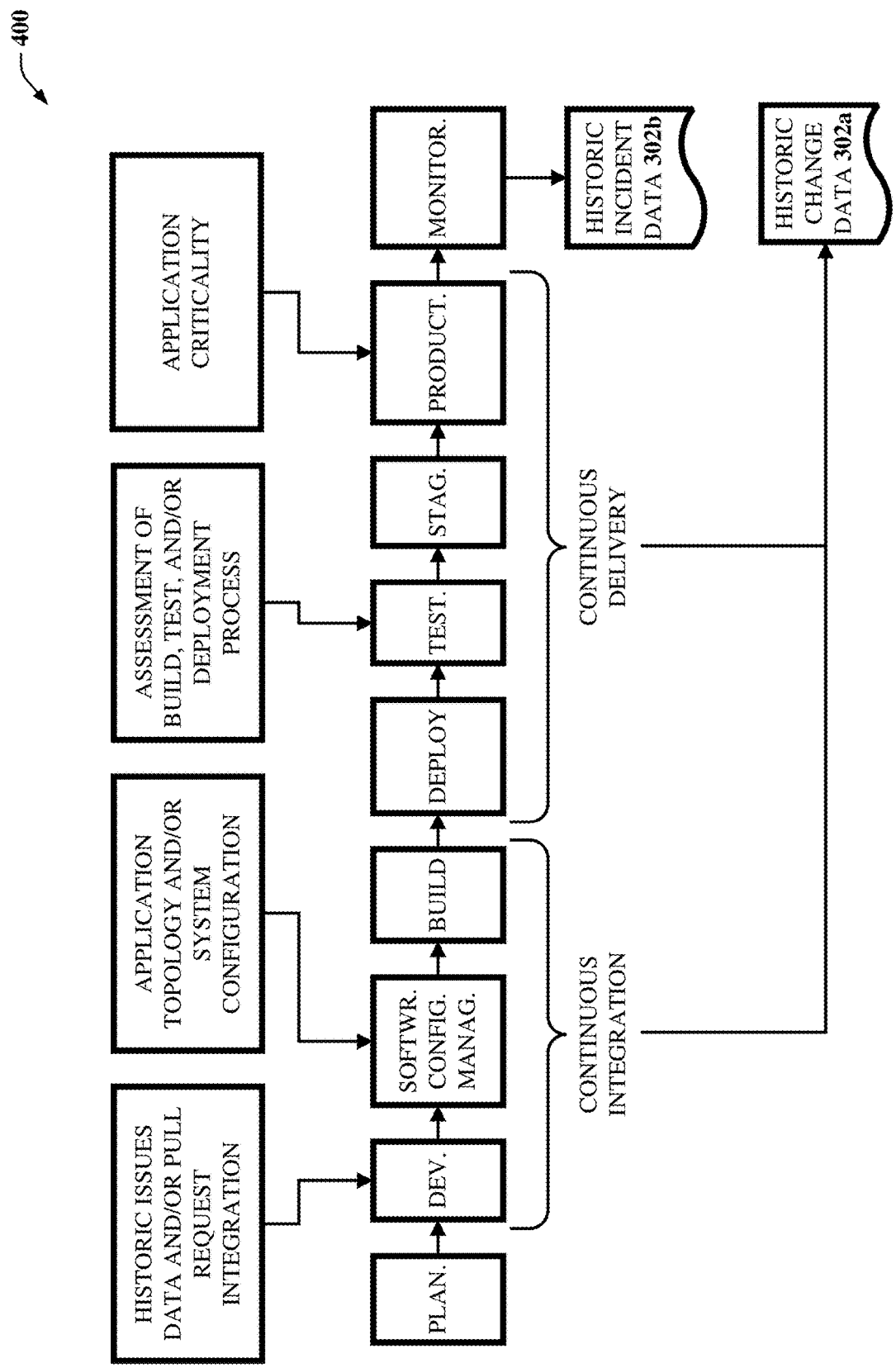

FIG. 4 illustrates a block diagram of an example, non-limiting system 400 that can facilitate discovery of an inexplicit link between a change and an incident in a computing environment in accordance with one or more embodiments described herein. Repetitive description of like elements and/or processes employed in respective embodiments is omitted for sake of brevity.

In some embodiments, change incident link system 102, system 100, system 200, and/or system 300 can be applied to a cloud native deployment environment, for example, a continuous integration and/or continuous delivery pipeline (CI/CD pipeline). In these embodiments, change incident link system 102 and/or one or more components thereof can extract (e.g., using an NLP model) information from various stages of a CI/CD pipeline. The example embodiment depicted in FIG. 4 illustrates how change incident link system 102 and/or one or more components thereof can extract such information from one or more stages of a CI/CD pipeline to obtain historic change data 302a and/or historic incident data 302b that can be used as inputs to change incident link system 102, system 100, system 200, and/or system 300 as described above with reference to FIGS. 1, 2, and 3.

As illustrated in the example embodiment depicted in FIG. 4, the various stages of a CI/CD pipeline from which change incident link system 102 and/or one or more components can extract information can include, but are not limited to: planning (denoted as "PLAN." in FIG. 4); development (denoted as "DEV." in FIG. 4); software configuration management (denoted as "SOFTWR. CONFIG. MANAG." in FIG. 4); build; deploy; testing (denoted as "TEST." in FIG. 4); staging (denoted as "STAG." in FIG. 4); production (denoted as "PRODUCT." in FIG. 4); and/or monitoring (denoted as "MONITOR." in FIG. 4). In the example embodiment depicted in FIG. 4, change incident link system 102 and/or one or more components thereof can extract from such various CI/CD pipeline stages described above information that can include, but is not limited to: historic issues data and/or pull request integration (e.g., information from the text in the issues, pull requests, release notes, and/or code scan and analysis); application topology and/or system configuration (e.g., container image details, properties, version numbers, dependent services, driver configuration similarity analysis, network configuration, and/or protocol and traffic information); assessment of build, test, and/or deployment process (e.g., number of test cases and analysis of the test case results (e.g., functional and non-functional testing), percentage of automated test cases and test coverage, and/or deployment of artifact quality and specifications (e.g., A/B testing)); and/or application criticality (e.g., number of services consuming this service, usage frequency of the services consuming the service, service workload (e.g., number of times the service is called in a given period)).

FIG. 5 illustrates an example, non-limiting algorithm 500 that can facilitate discovery of an inexplicit link between a change and an incident in a computing environment in accordance with one or more embodiments described herein. Repetitive description of like elements and/or processes employed in respective embodiments is omitted for sake of brevity.

Algorithm 500 can comprise an algorithm that can be implemented (e.g., executed, run) by change incident link system 102 and/or one or more components thereof in accordance with one or more embodiments of the subject disclosure. For example, as described above with reference to FIGS. 1 and 2, analysis component 108 can implement (e.g., execute, run) algorithm 500 to the defined link strength (e.g., defined link strength threshold that can constitute a minimum link strength) that can be used by extraction component 110 and/or filter component 202 to discover one or more inexplicit links between change data and incident data and/or to filter one or more false inexplicit links, respectively.

Figure 6:
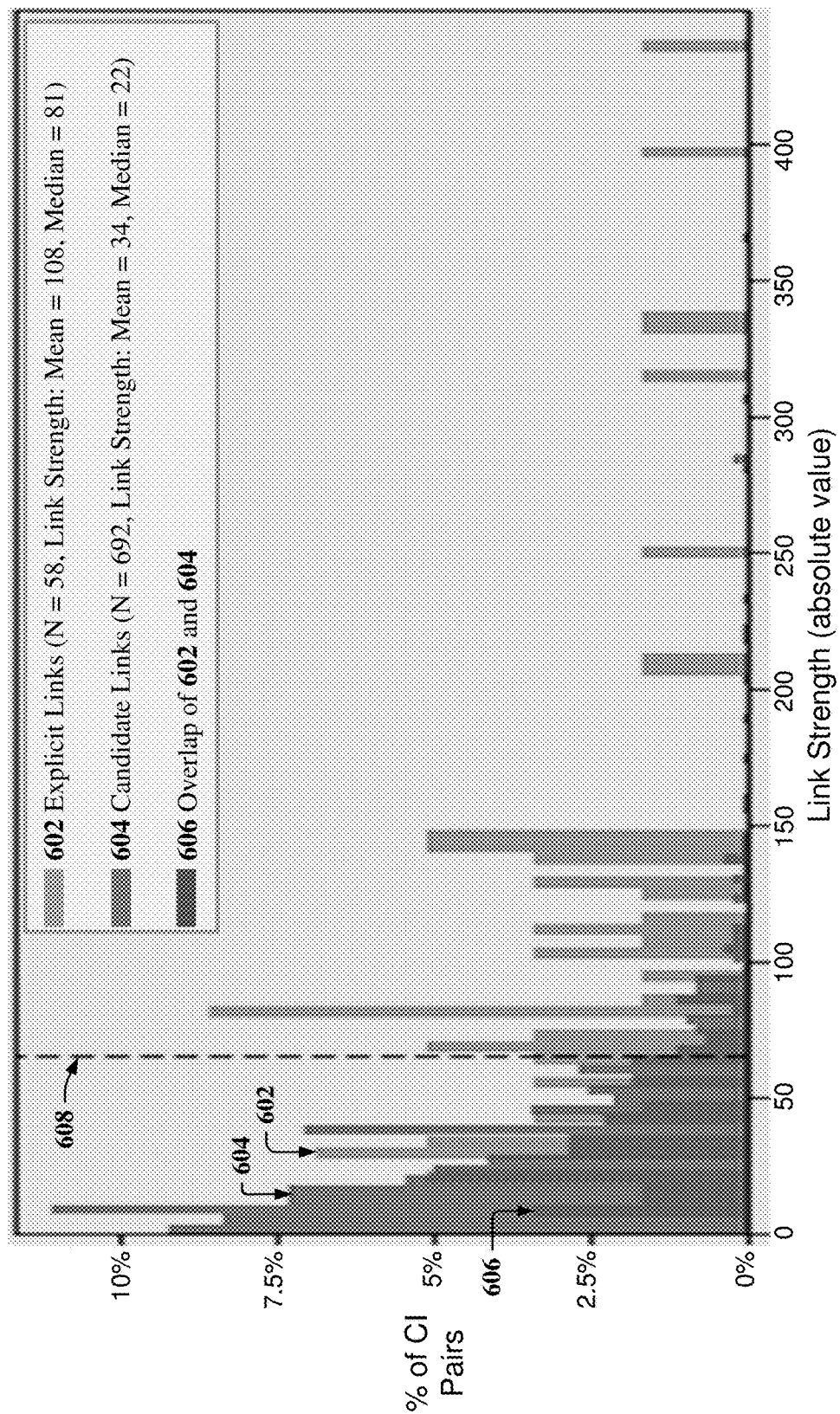
FIG. 6 illustrates an example, non-limiting histogram that can facilitate discovery of an inexplicit link between a change and an incident in a computing environment in accordance with one or more embodiments described herein.

FIG. 6 illustrates an example, non-limiting histogram 600 that can facilitate discovery of an inexplicit link between a change and an incident in a computing environment in accordance with one or more embodiments described herein. Repetitive description of like elements and/or processes employed in respective embodiments is omitted for sake of brevity.

Histogram 600 depicted in FIG. 6 illustrates results data obtained from an implementation of change incident link system 102 in accordance with one or more embodiments of the subject disclosure. Histogram 600 illustrates a comparison of change-incident linkage for explicit links and candidate links in terms of the percentage (%) of change-incident pairs (denoted as "% of CI Pairs" in FIG. 6) and link strength. In this example implementation of change incident link system 102 that provided the results data of histogram 600, explicit links are represented by bars 602, candidate links are represented by bars 604, and areas of histogram 600 where bars 602 and bars 604 overlap are represented by bars 606. In this example implementation of change incident link system 102, the value for optimal cutoff $\theta_{optimal}$ chosen by the optimization function employed by analysis component 108 is 65, as represented by dashed line 608 on histogram 600.

Figure 7:
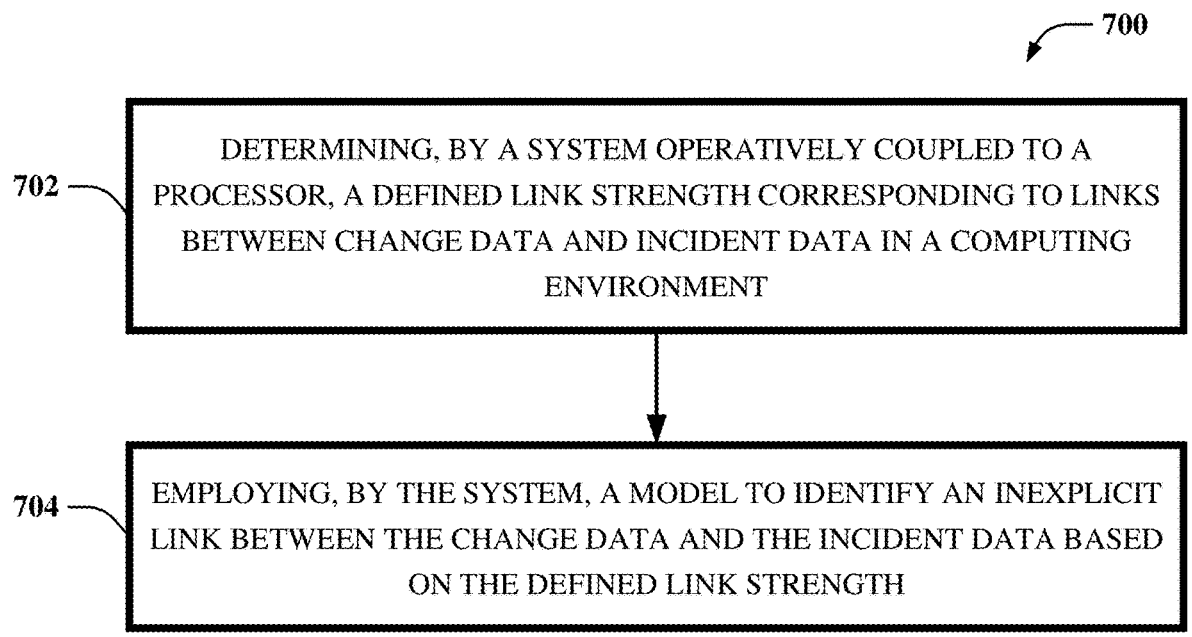
FIG. 7 illustrates a flow diagram of an example, non-limiting computer-implemented method that can facilitate discovery of an inexplicit link between a change and an incident in a computing environment in accordance with one or more embodiments described herein.

FIG. 7 illustrates a flow diagram of an example, non-limiting computer-implemented method 700 that can facilitate discovery of an inexplicit link between a change and an incident in a computing environment in accordance with one or more embodiments described herein. Repetitive description of like elements and/or processes employed in respective embodiments is omitted for sake of brevity.

At 702, computer-implemented method 700 can comprise determining, by a system (e.g., via change incident link system 102 and/or analysis component 108) operatively coupled to a processor (e.g., processor 106), a defined link strength corresponding to links between change data and incident data in a computing environment.

At 704, computer-implemented method 700 can comprise employing, by the system (e.g., via change incident link system 102 and/or extraction component 110), a model to identify an inexplicit link between the change data and the incident data based on the defined link strength.

Change incident link system 102 can be associated with various technologies. For example, change incident link system 102 can be associated with computing environment technologies, operational risk assessment technologies, ML and/or AI model technologies, cloud computing technologies, and/or other technologies.

Change incident link system 102 can provide technical improvements to systems, devices, components, operational steps, and/or processing steps associated with the various technologies identified above. For example, change incident link system 102 can discover an inexplicit link between a change and an incident in a computing environment by: determining a defined link strength corresponding to links between change data and incident data in a computing environment; and/or employing a model to identify an inexplicit link between the change data and the incident data based on the defined link strength. In this example, based on discovering one or more inexplicit links between historical change data (e.g., in a change ticket) and historical incident data (e.g., in an incident ticket), change incident link system 102 can thereby enable proactive assessment of operational risk associated with a proposed change in a computing environment prior to implementation of the proposed change. In this example, by enabling such proactive assessment of operational risk associated with a proposed change in a computing environment, change incident link system 102 can further enable an entity (e.g., an SRE) to reduce operational risk of one or more computing resources in the computing environment. In another example, change incident link system 102 can assign and/or alter the above referenced defined link strength based on feedback from an expert entity, thereby facilitating reduced identification of false inexplicit links and/or improve accuracy and/or performance of the above referenced model in identifying the inexplicit link, which can further enable an entity such as, for instance, an SRE to reduce operational risk associated with one or more computing resources of the computing environment.

Change incident link system 102 can provide technical improvements to a processing unit associated with change incident link system 102. For example, as described above, by discovering one or more inexplicit links between historical change data (e.g., in a change ticket) and historical incident data (e.g., in an incident ticket), change incident link system 102 can enable proactive assessment of operational risk associated with a proposed change in a computing environment prior to implementation of the proposed change, which can enable an entity (e.g., an SRE) to reduce operational risk of one or more computing resources in the computing environment. In this example, such one or more computing resources can comprise a processing unit (e.g., a processor) and based on discovery of such one or more inexplicit links, such an entity can identify potential incident(s) that can potentially: reduce the performance and/or efficiency of the processing unit; cause damage to the processing unit; interrupt operation of the processing unit; and/or cause the processing unit to malfunction.

A practical application of change incident link system 102 is that it can be implemented in a computing environment to assess operational risk associated with changes in the computing environment. For example, a practical application of change incident link system 102 is that it can be implemented to proactively assess operational risk associated with a certain proposed change in a classical based, cloud based, and/or quantum based computing environment before the proposed change is implemented to identify potential incidents that can result from the proposed change.

It should be appreciated that change incident link system 102 provides a new approach driven by relatively new operational risk assessment technologies. For example, change incident link system 102 provides a new approach to discover inexplicit links between historic change data (e.g., in a change ticket) and historic incident data (e.g., in an incident ticket) that can enable proactive assessment of operational risk associated with a proposed change in a classical based, cloud based, and/or quantum based computing environment before the proposed change is implemented.

Change incident link system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Change incident link system 102 and/or components thereof, can be employed to solve new problems that arise through advancements in technologies mentioned above, employment of quantum computing systems, cloud computing systems, computer architecture, and/or another technology.

It is to be appreciated that change incident link system 102 can utilize various combinations of electrical components, mechanical components, and circuitry that cannot be replicated in the mind of a human or performed by a human, as the various operations that can be executed by change incident link system 102 and/or components thereof as described herein are operations that are greater than the capability of a human mind. For instance, the amount of data processed, the speed of processing such data, or the types of data processed by change incident link system 102 over a certain period of time can be greater, faster, or different than the amount, speed, or data type that can be processed by a human mind over the same period of time.

According to several embodiments, change incident link system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that change incident link system 102 can include information that is impossible to obtain manually by an entity, such as a human user. For example, the type, amount, and/or variety of information included in change incident link system 102, analysis component 108, extraction component 110, and/or filter component 202 can be more complex than information obtained manually by an entity, such as a human user.

In some embodiments, change incident link system 102 can be associated with a cloud computing environment. For example, change incident link system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Change incident link system 102 and/or components thereof (e.g., analysis component 108, extraction component 110, filter component 202, and/or another component) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by change incident link system 102 and/or components thereof to execute one or more operations in accordance with one or more embodiments of the subject disclosure described herein. For instance, change incident link system 102 and/or components thereof can employ such one or more classical and/or quantum computing resources to execute one or more classical and/or quantum: mathematical function, calculation, and/or equation; computing and/or processing script, processing thread, and/or instruction; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
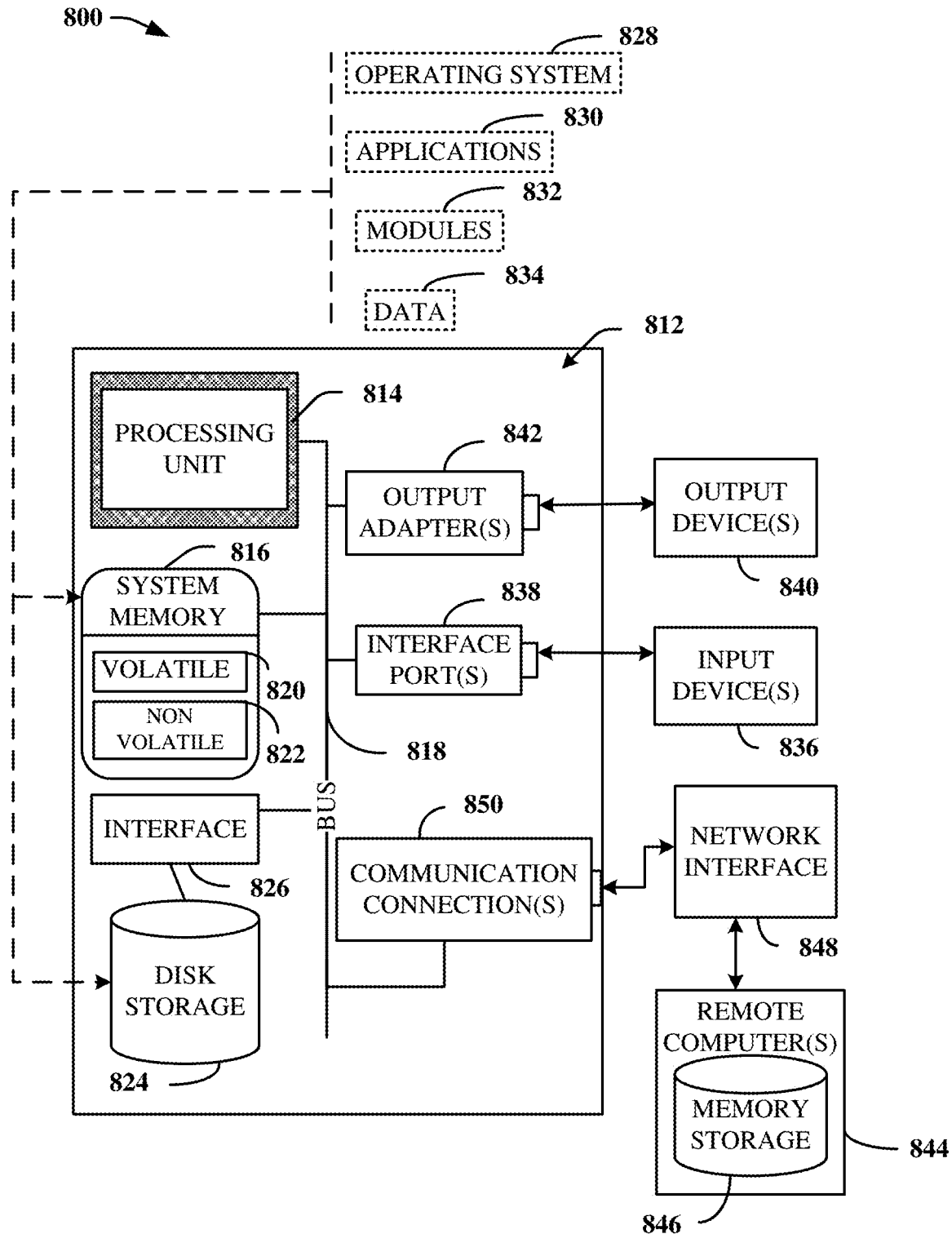
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
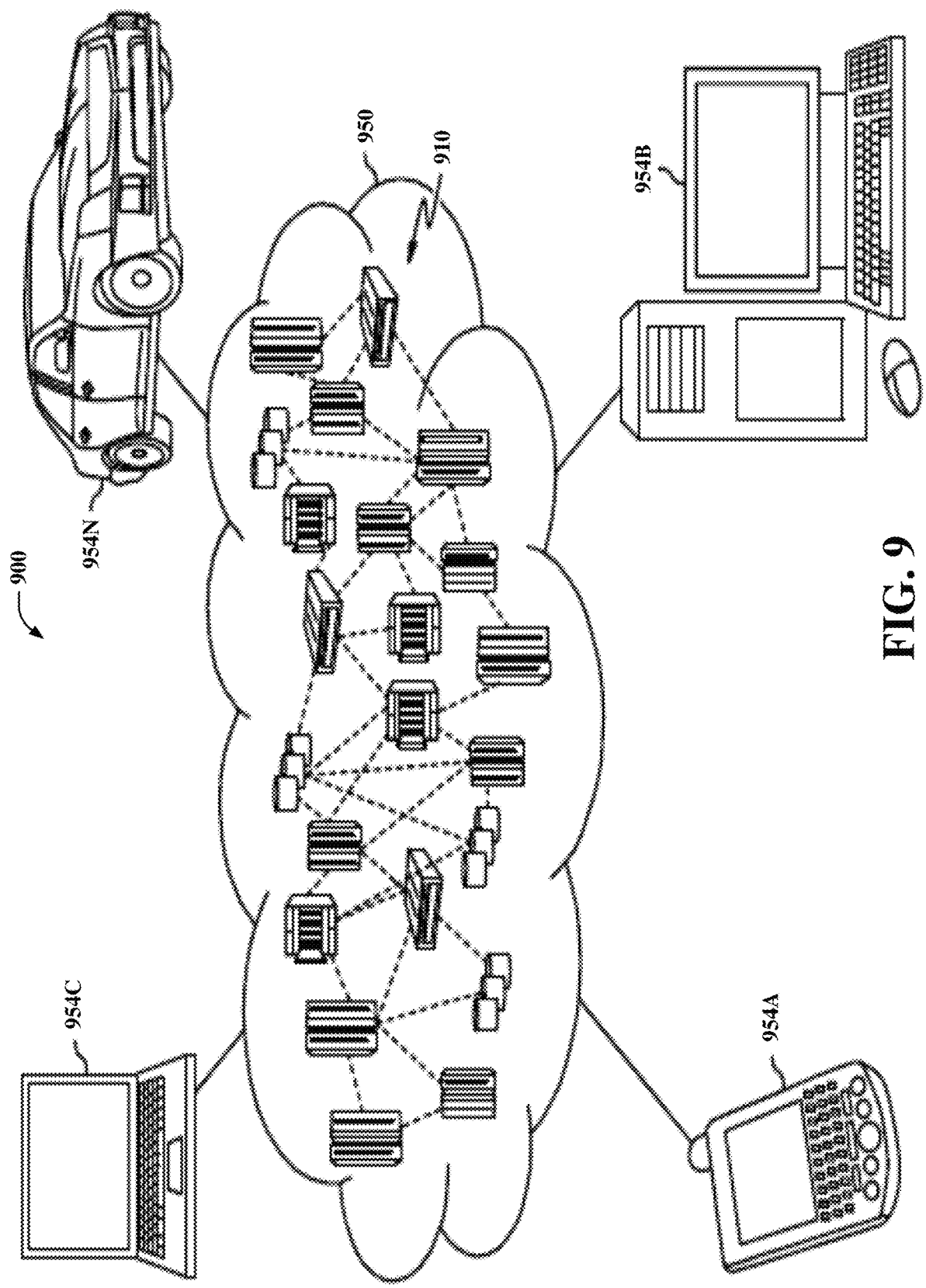
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
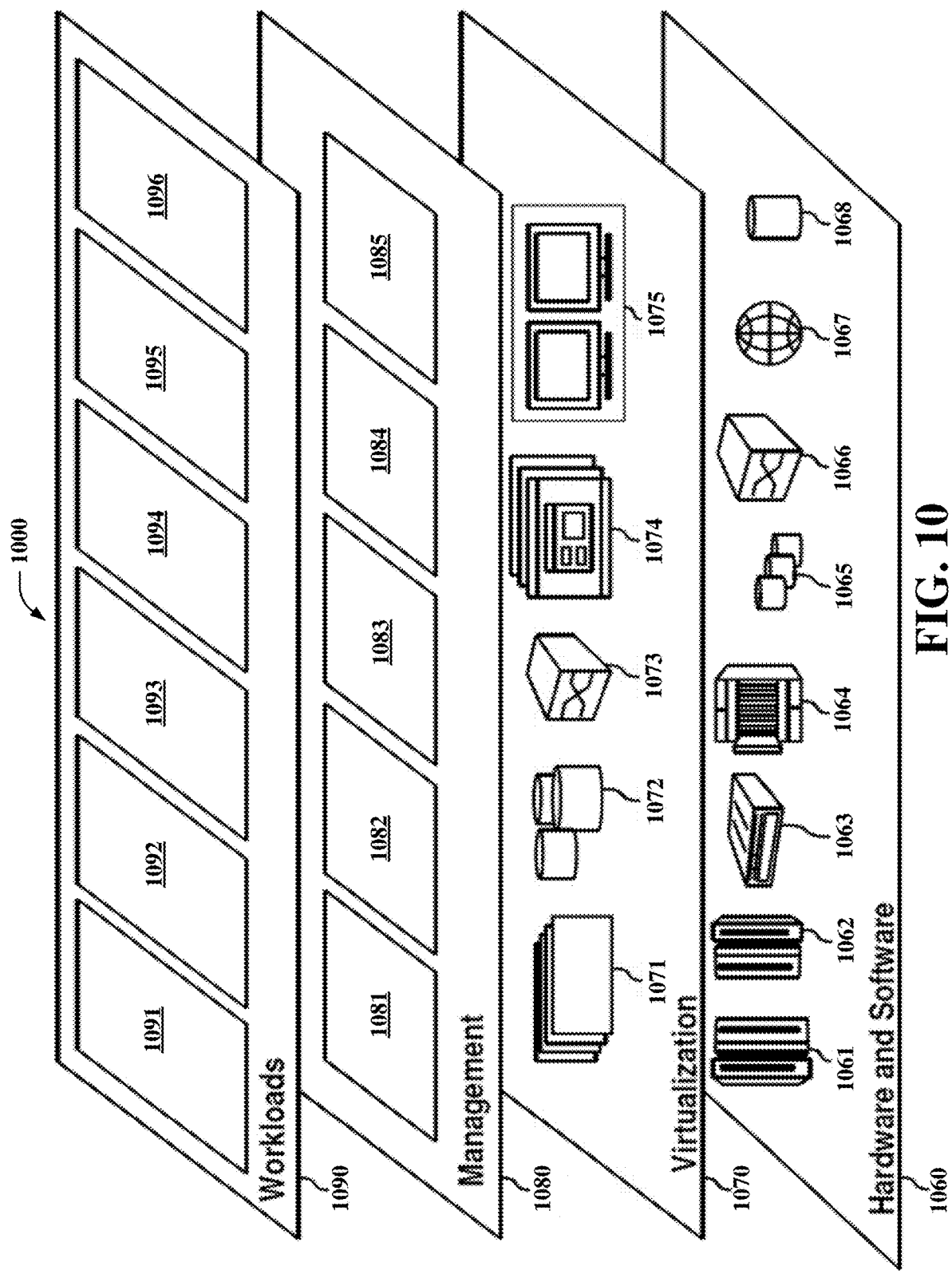
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and change incident link software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a processor that executes computer executable components stored in memory, the computer executable components comprising:
  an analysis component that determines a defined link strength threshold based on links between change data describing changes to a computing environment and incident data describing incidents that occurred in the computing environment; and
  an extraction component that employs a model to identify an inexplicit link between a change of the changes in the change data and an incident of the incidents in the incident data based on the inexplicit link having a link strength that satisfies the defined link strength threshold.

2. The system of claim 1, wherein the incident occurred within a defined amount of time after the change occurred, and wherein the analysis component generates one or more candidate links between one or more of the changes in the change data and one or more of the incidents in the incident data and determines respective link strengths of the one or more candidate links.

3. The system of claim 1, wherein the analysis component determines the defined link strength threshold based on at least one of explicit links between first changes of the changes in the change data and first incidents of the incidents in the incident data that have one or more first common features or candidate links between second changes of the changes in the change data and second incidents of the incidents in the incident data that have one or more second common features.

4. The system of claim 1, wherein the analysis component employs an active learning process to determine or modify the defined link strength threshold based on expert entity feedback corresponding to at least one of the defined link strength threshold or the inexplicit link.

5. The system of claim 4, wherein the analysis component employs the active learning process to reduce identification of false inexplicit links, improve accuracy or performance of the model in identifying the inexplicit link, or reduce operational risk associated with one or more computing resources of the computing environment.

6. The system of claim 1, wherein the computer executable components further comprise:
a filter component that filters at least one false inexplicit link from one or more inexplicit links identified by the model.

7. The system of claim 1, wherein the computer executable components further comprise:
a filter component that employs an active learning process to filter at least one false inexplicit link from one or more inexplicit links identified by the model, and wherein the active learning process is based on expert entity feedback corresponding to at least one of the defined link strength threshold or the inexplicit link.

8. A computer-implemented method, comprising:
determining, by a system operatively coupled to a processor, a defined link strength threshold based on links between change data describing changes to a computing environment and incident data describing incidents that occurred in the computing environment; and
employing, by the system, a model to identify an inexplicit link between the change data and the incident data based on the defined link strength.

9. The computer-implemented method of claim 8, wherein the incident occurred within a defined amount of time after the change occurred, and further comprising:
generating, by the system, one or more candidate links between one or more of the changes in the change data and one or more of the incidents in the incident data; and
determining, by the system, respective link strengths of the one or more candidate links.

10. The computer-implemented method of claim 8, further comprising:
determining, by the system, the defined link strength threshold based on at least one of explicit links between first changes of the changes in the change data and first incidents of the incidents in the incident data that have one or more first common features or candidate links between second changes of the changes in the change data and second incidents of the incidents in the incident data that have one or more second common features.

11. The computer-implemented method of claim 8, further comprising:
employing, by the system, an active learning process to determine or modify the defined link strength threshold based on expert entity feedback corresponding to at least one of the defined link strength threshold or the inexplicit link.

12. The computer-implemented method of claim 11, further comprising:
employing, by the system, the active learning process to reduce identification of false inexplicit links, improve accuracy or performance of the model in identifying the inexplicit link, or reduce operational risk associated with one or more computing resources of the computing environment.

13. The computer-implemented method of claim 8, further comprising:
filtering, by the system, at least one false inexplicit link from one or more inexplicit links identified by the model.

14. The computer-implemented method of claim 8, further comprising:
employing, by the system, an active learning process to filter at least one false inexplicit link from one or more inexplicit links identified by the model, wherein the active learning process is based on expert entity feedback corresponding to at least one of the defined link strength threshold or the inexplicit link.

15. A computer program product comprising a computer readable storage medium having program instructions embodied therewith, the program instructions executable by a processor to cause the processor to:
determine a defined link strength threshold based on links between change data describing changes to a computing environment and incident data describing incidents that occurred in the computing environment; and
employ a model to identify an inexplicit link between the change data and the incident data based on the defined link strength.

16. The computer program product of claim 15, wherein the incident occurred within a defined amount of time after the change occurred, and wherein the program instructions are further executable by the processor to cause the processor to:
generate one or more candidate links between one or more of the changes in the change data and one or more of the incidents in the incident data; and
determine respective link strengths of the one or more candidate links.

17. The computer program product of claim 15, wherein the program instructions are further executable by the processor to cause the processor to:
determine the defined link strength threshold based on at least one of explicit links between first changes of the changes in the change data and first incidents of the incidents in the incident data that have one or more first common features or candidate links between second changes of the changes in the change data and second incidents of the incidents in the incident data that have one or more second common features.

18. The computer program product of claim 15, wherein the program instructions are further executable by the processor to cause the processor to:
employ an active learning process to determine or modify the defined link strength threshold based on expert entity feedback corresponding to at least one of the defined link strength threshold or the inexplicit link.

19. The computer program product of claim 15, wherein the program instructions are further executable by the processor to cause the processor to:
- filter at least one false inexplicit link from one or more inexplicit links identified by the model.

20. The computer program product of claim 15, wherein the program instructions are further executable by the processor to cause the processor to:
- employ an active learning process to filter at least one false inexplicit link from one or more inexplicit links identified by the model, and wherein the active learning process is based on expert entity feedback corresponding to at least one of the defined link strength threshold or the inexplicit link.

* * * * *